Figures 1, 2:
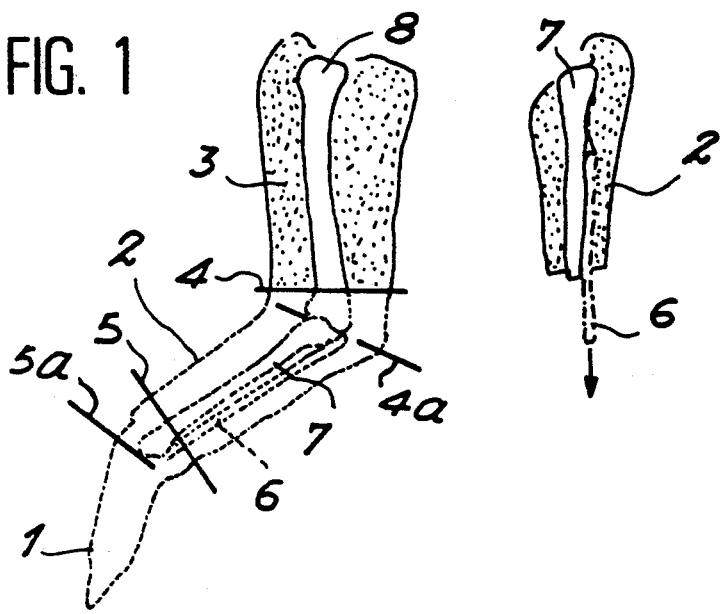

United States Patent [19]
Cresson et al.

[11] Patent Number: 5,267,891
[45] Date of Patent: Dec. 7, 1993

[54] MACHINE FOR PROCESSING THE MEAT OF CHICKEN WINGS

[76] Inventors: Christian Cresson, 6 Rue Marie Therese de Poix, 37800 Sepmes, France; Amnon Levy, 29 Alonim, St. Tivon, Israel, 36000

[21] Appl. No.: 926,410

[22] Filed: Aug. 10, 1992

[30] Foreign Application Priority Data

Aug. 9, 1991 [FR] France ............... 91 10171

[51] Int. Cl.⁵ .................................................. A22C 17/04
[52] U.S. Cl. ...................... 452/136; 452/135; 452/138
[58] Field of Search ............ 452/169, 135, 136, 138, 452/127

[56] References Cited

U.S. PATENT DOCUMENTS

| | | | |
|---|---|---|---|
| 3,412,425 | 11/1968 | Sturm | 452/138 |
| 3,470,581 | 10/1969 | Hopkins | 452/149 |
| 3,629,903 | 8/1969 | Turner | 452/137 |
| 4,377,884 | 3/1983 | Viscolosi | 452/138 |
| 4,446,600 | 5/1984 | Holley et al. | 452/138 |
| 4,901,399 | 2/1990 | Hegelmann | 452/136 |
| 4,942,642 | 7/1990 | Fankhauser, II et al. | 452/136 |
| 5,064,403 | 11/1991 | Elsten | 452/138 |
| 5,090,940 | 2/1992 | Adkison | 452/136 |

FOREIGN PATENT DOCUMENTS

| | | |
|---|---|---|
| 0049091 | 4/1982 | European Pat. Off. . |
| 0278122 | 8/1988 | European Pat. Off. . |
| 0321718 | 6/1989 | European Pat. Off. . |
| 2227369 | 6/1972 | Fed. Rep. of Germany . |
| 8815181 | 3/1989 | Fed. Rep. of Germany . |
| 2566629 | 1/1986 | France . |

*Primary Examiner*—Willis Little
*Attorney, Agent, or Firm*—Young & Thompson

[57] ABSTRACT

A machine is designed for trussing-up flesh and/or skin over a bone or a bone stump.

The machine comprises an axially aligned set of a pusher device (11), a holder device (9) and movable jaws forming a cone (44).

The machine is adapted for the industrial preparation of ready-to-cook chicken wings.

10 Claims, 7 Drawing Sheets

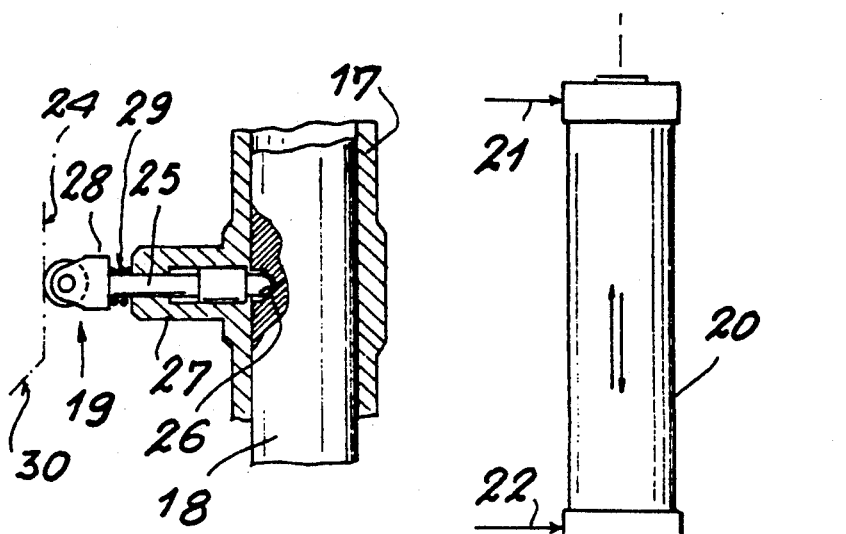
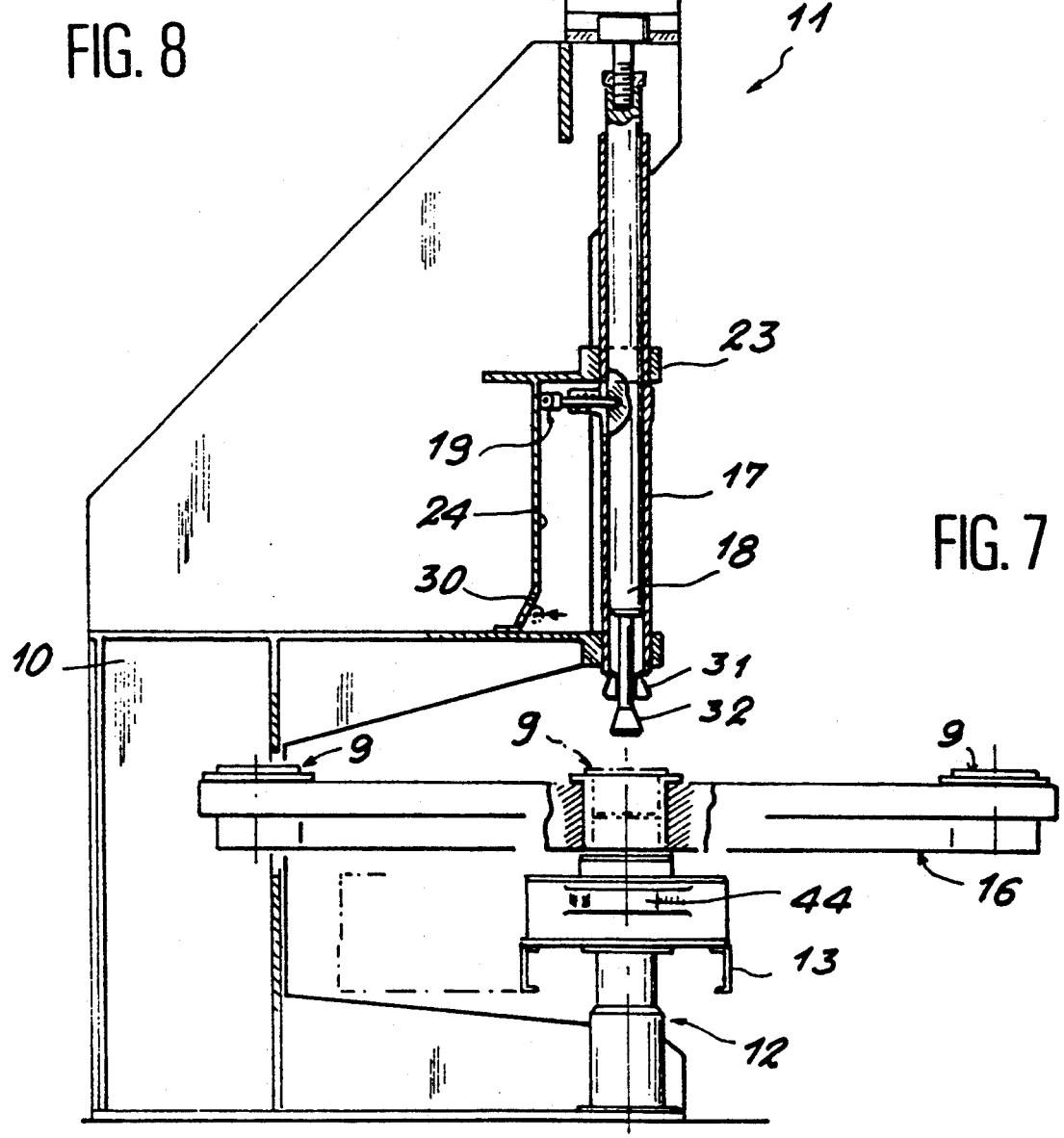
FIG. 8
FIG. 7

MACHINE FOR PROCESSING THE MEAT OF CHICKEN WINGS

This invention relates to a machine for processing the meat of the wings of poultry, and more specifically, without this limiting the scope of the invention, for processing the meat of chicken wings.

It is known, particularly in Asiatic cookery, to prepare various kinds of lollipops made from chicken wings and pinions, the meat of which has been trussed up over the bone while it remains partly attached thereto, the bone forming a prehension stick for the meat which is shaped into a kind of fried meatball. The preparation of such chicken lollipops is exclusively a manual work, and it consists, after having cut the wing 2 and the pinion 3 along the lines 4 and 5 shown in FIG. 1 and discarding the tip 1, in removing the radius of the pinion, in trussing up the skin and the meat towards the upper end of the remaining bone, all these operations being carried out manually.

Chicken wings and pinions are parts of the animal which at present have a very small commercial value in the industrial processing of poultry, since they comprise a very high percentage of skin, gristle and bone, but only a very small amount of meat, so that heretofore they have merely been considered as by-products of low value, which are mainly used in animal feed.

It is desirable to achieve the automatic preparation of such chicken meat lollipops, starting from the wings and pinions, so as to obtain a better value of these poultry parts, and using these parts for obtaining therefrom a ready-to-cook dish of good sales value.

It is more particularly desirable to achieve the automation of the operation for trussing up the skin and the meat along the bones of the wing and pinion after cutting them open, since it is the lack of such automation which has heretofore prevented obtaining commercial value from this part of the animal.

It is therefore the object of the present invention of providing a machine for the automatic trussing-up of the skin and meat of poultry wings and pinions having previously been slit open, and more particularly in the case of chickens.

This object is achieved by providing a machine in accordance with the present invention, which comprises the following devices which are aligned together:
a pusher device, the head of which is intended for being pressed against the upper part of the pre-cut wing or pinion;
a holder coaxial with the pusher device, holding individually each wing or pinion aligned between the pusher device and a clamping device;
a clamping device with movable jaws being slidable against springs and forming a stepped hollow cone through which the wing or pinion is pushed by the pusher device.

This pushing action across the stepped slidable jaws effects the trussing-up of the skin and meat remaining attached to the bone, as they are trussed up over the cotyloid, so that they will be shaped into an edible meatball as the said jaws are gradually moving apart against their respective springs while the meat becomes shaped into a ball, the jaws thereafter reverting automatically to their tightened position after the meatball has passed therethrough and has been released by retraction of the pusher device.

Preferably, the pusher device, the holder and the movable jaws are mounted in a vertical coaxial alignment, but an horizontal coaxial alignment may also be envisaged without departing from the scope of the invention.

Figure 13:
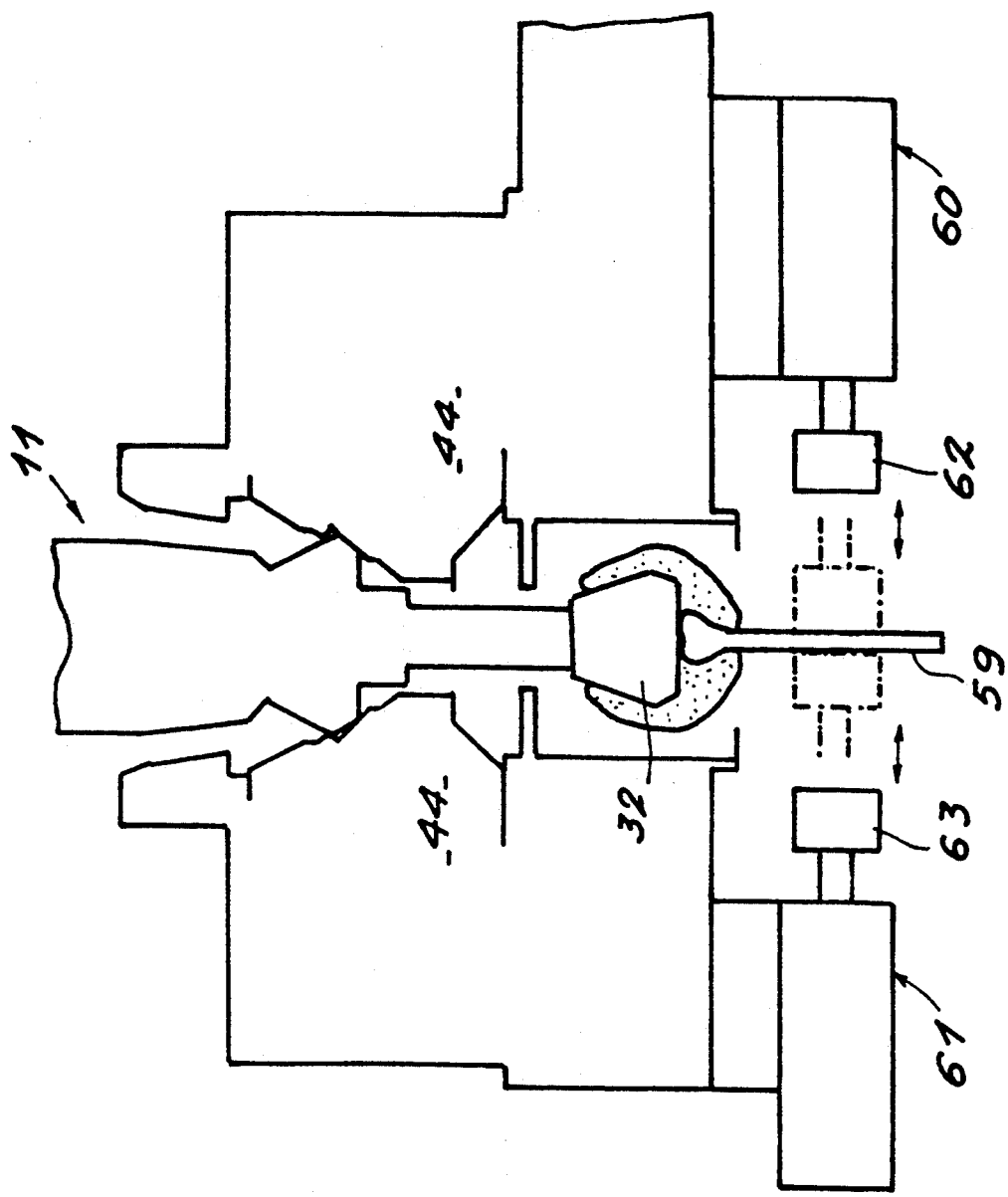

In a preferred embodiment, the pusher device is formed of a telescopic cylinder having two elements, the head of the first element being intended for abutting at the end of its stroke against the lower end of the cone formed by the jaws, while the head of the second element bears against the cotyle of the wing or pinion to be processed, the abutting of said first element actuating the release of a latch, thereby allowing said second element to pass through the cone for completing the trussing-up of the flesh and skin over the cotyle, and then the meatball is held at the bone level by a clamping device actuated by a cylinder (see FIG. 13). After the pusher device is retracted in its initial position, the clamping device releases the lollipop.

In another advantageous embodiment, the holder is formed of a tubular sleeve, both ends of which are closed by a deformable diaphragm presenting a hole at its center. This makes it very easy to place the parts to be treated in a correct position, while ensuring that they are perfectly aligned in the apparatus. Furthermore, the use of these flexible diaphragms avoids having to resort to complex mechanical devices for maintaining the parts being processed, while allowing said parts to slide under the action of the pusher device. Finally, the passage of the wings or pinions through the diaphragms of the holder provides for an initial trussing-up of the skin and meat.

Preferably, the holder is provided with an additional intermediary diaphragm for enhancing this trussing-up action and for guiding the parts being processed.

Preferably also, a plurality of identical holders are mounted at the periphery of a revolving plate disposed between the pusher device and the movable jaw device. Thus, by means of a suitable servo drive, each return stroke of the pusher mechanism causes the disk to rotate and the automatic introduction of a new piece to be processed.

Figures 3, 4:
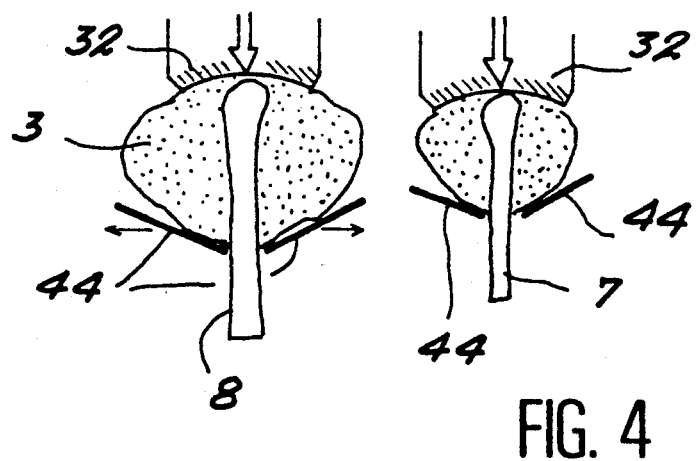
Figures 5, 6:
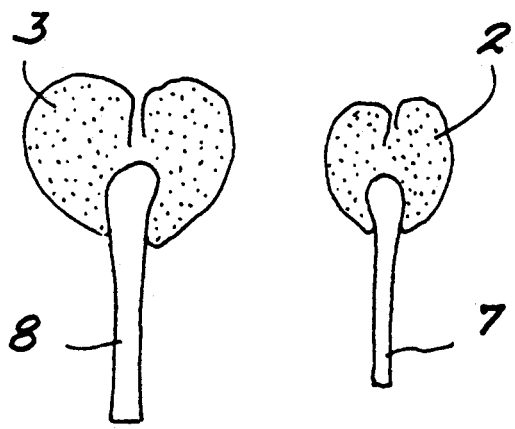
Figure 9:
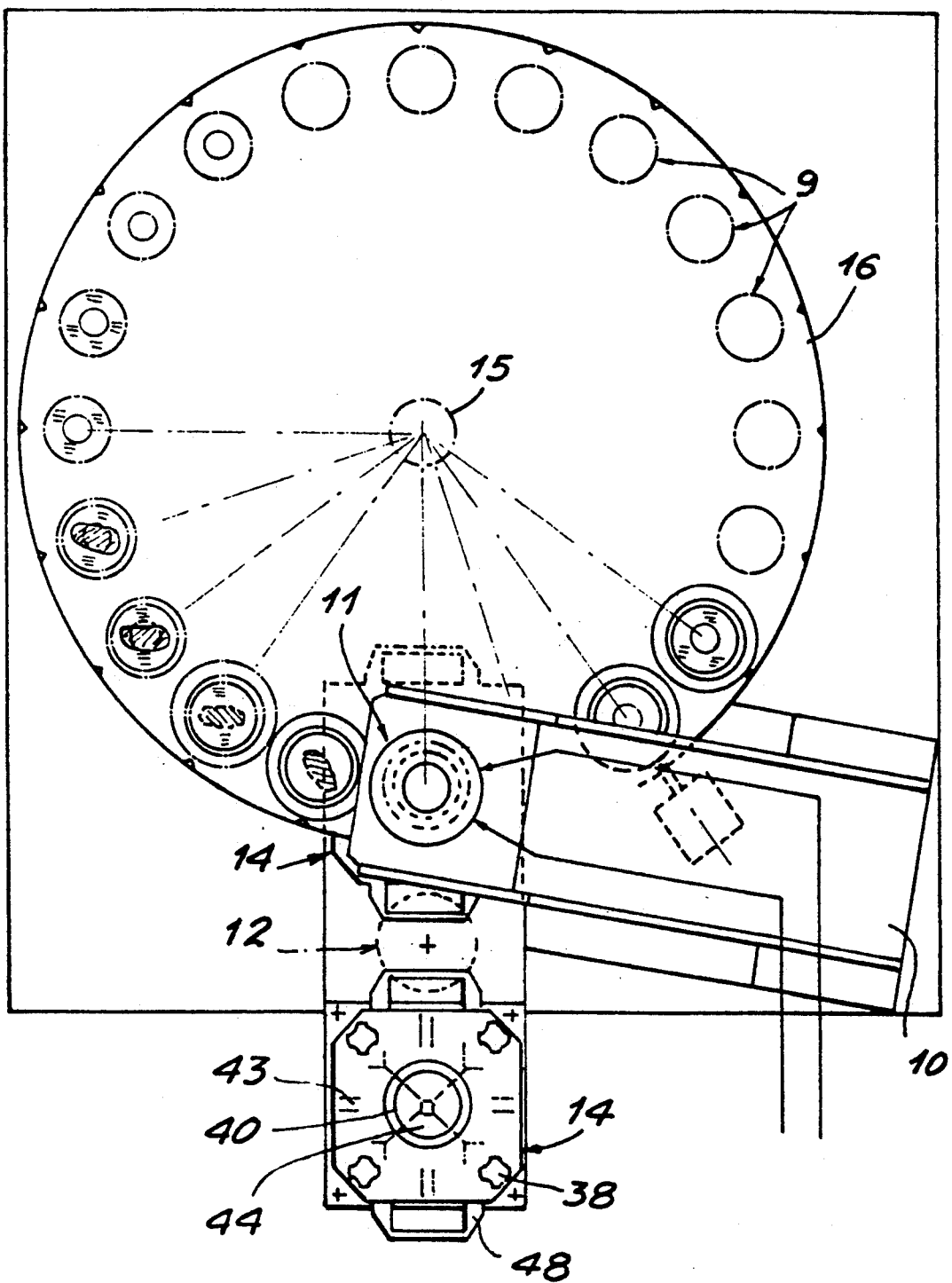
Figure 10:
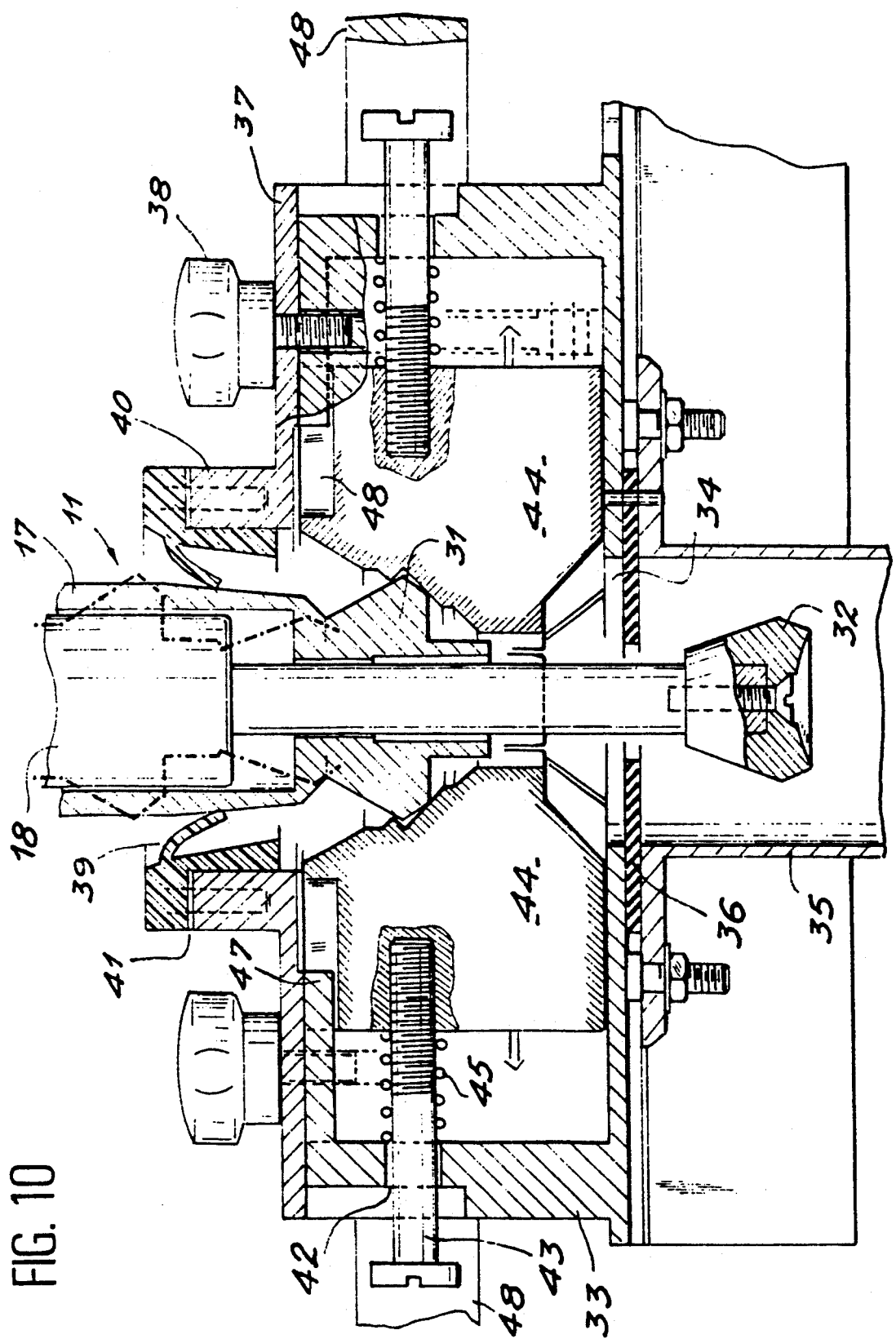
Figure 11:
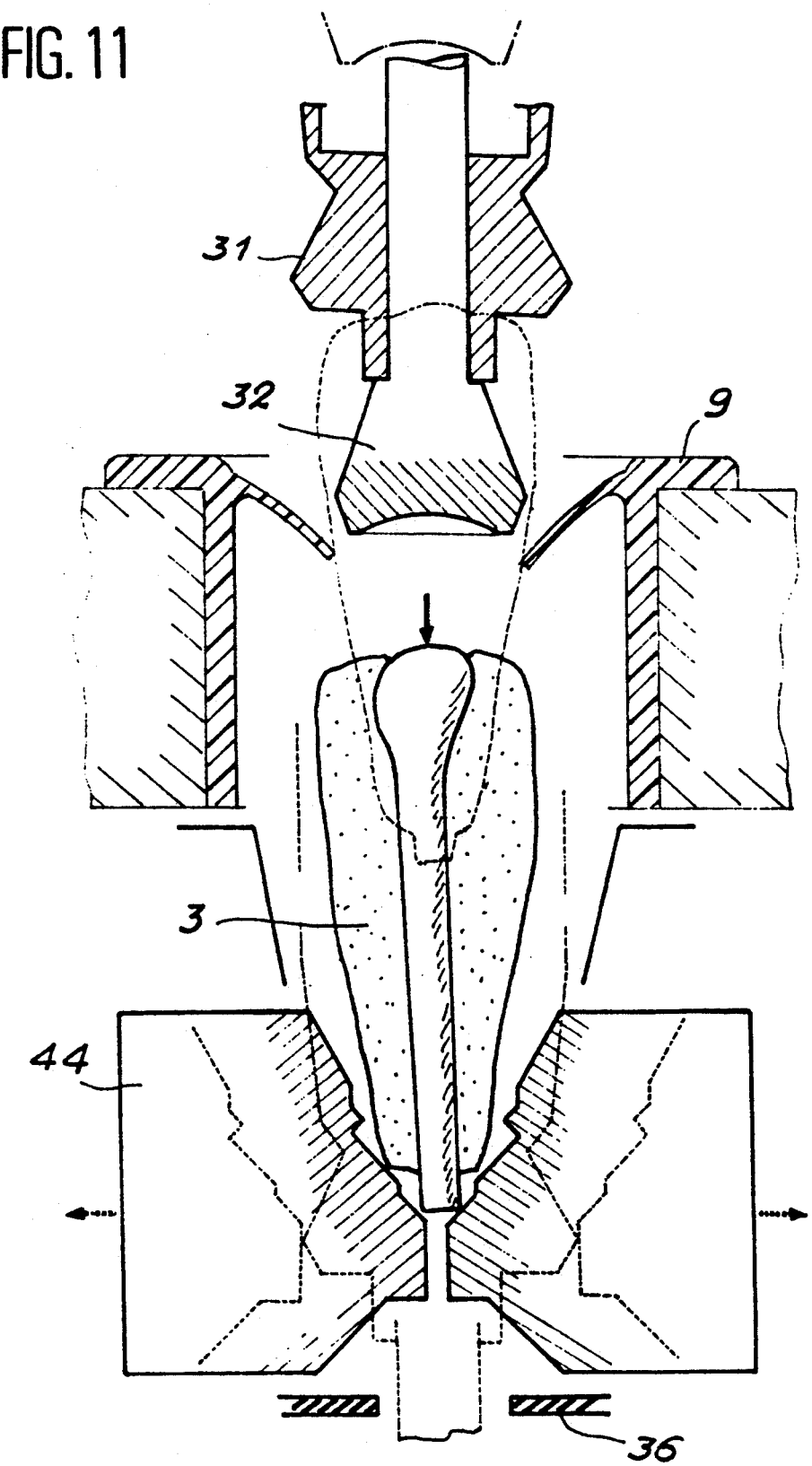
Figure 12:
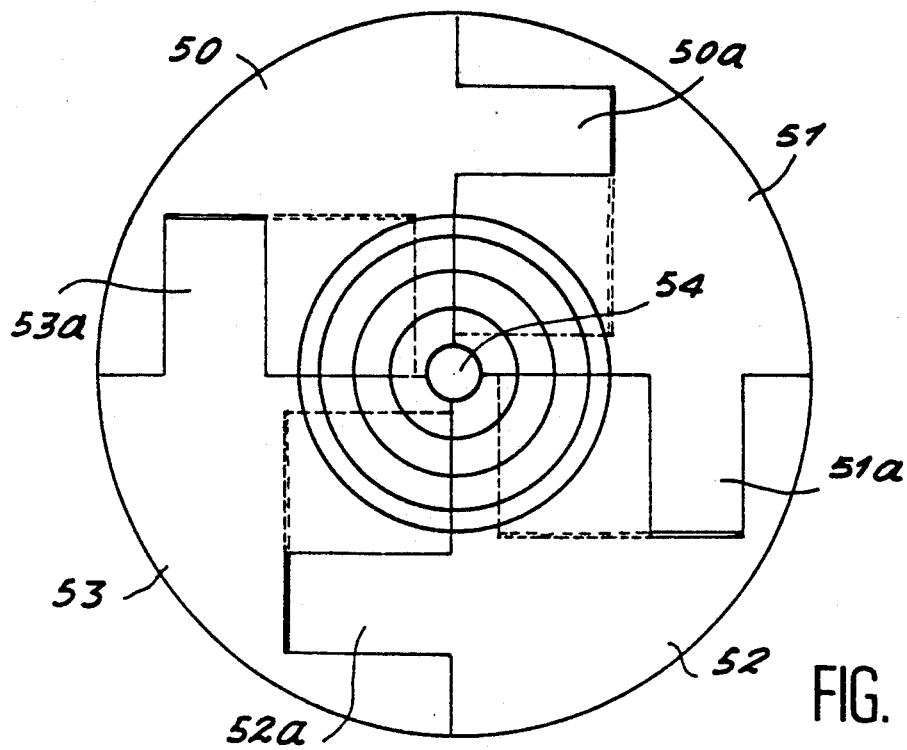
Figure 12:
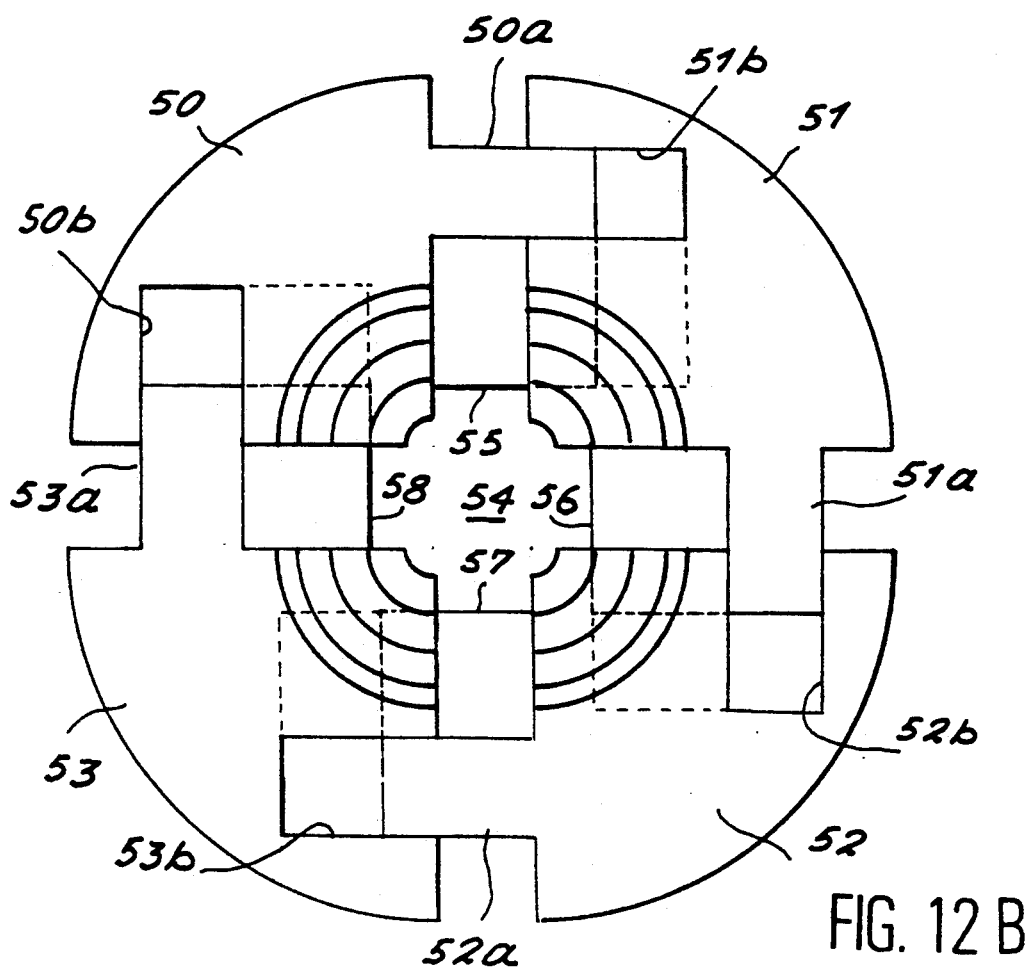

Further features and advantages of the invention will emerge from the following description of an example of an embodiment of a machine for trussing-up the pre-cut chicken wings and pinions, referring to the appended drawings in which are shown diagrammatically:

FIG. 1 Partly in cross-section, a view of a chicken wing before cutting;

FIG. 2 A cross-section of a pre-cut chicken pinion;

FIG. 3 A cross-sectional view of a chicken wing held between the head of the pusher device and the movable jaws;

FIG. 4 A cross-sectional view of a chicken pinion held between the head of the pusher device and the movable jaws;

FIG. 5 A cross-section view of a chicken meat lollipop manufactured from a wing in the machine according to the invention;

FIG. 6 A cross-section view of a chicken meat lollipop manufactured from a pinion in the machine according to the invention;

FIG. 7 A vertical cross-section of a machine according to the invention;

FIG. 8 A view, partly in cross-section, at an enlarged scale, of the latch of the telescopic cylinder in the machine of FIG. 7;

FIG. 9 A view of the machine of FIG. 7, seen from above;

FIG. 10 A vertical cross-section, at an enlarged scale, of the movable jaw device in the machine of FIG. 7;

FIG. 11 A cross-section view illustrating the passage of a chicken wing through the holder provided with flexible membranes and through the movable jaws;

FIG. 12A and 12B. Two schematic views, taken from above, of a preferred embodiment of movable jaws according to the invention; and FIG. 13 A vertical cross-section of a preferred embodiment of the device according to the invention.

As previously stated, it can be seen from FIG. 1 that a chicken wing comprises a tip 1, a pinion 2 and a wing 3. For preparing ready-to-cook chicken lollipops, the wing 3 and the pinion 2 are cut open along respective cutting lines 4 and 5 or 4a and 5a, slightly above the lower cotyles of the bones or along the cutting lines 4a and 5a corresponding to the joints of the wing. The tip 1 is waste material which may however be used in animal feed.

During this cutting operation, the flesh and the skin have a natural trend to retract towards the apex of the bone to which they remain attached by the sinews and gristles. This releases the free end of the bones 6 and 7 of the pinion and 8 of the wing. The radius 6 of the pinion is then simply removed by pulling it out, as shown schematically in FIG. 2.

The wing and pinion portions having thus been prepared are then individually inserted with the free end of the bone protruding downwardly into the holders 9 provided with membranes, in the apparatus which will now be described with more detail, referring to FIGS. 7-11.

The machine includes a stand 10 carrying in its upper section a telescopic cylinder unit 11 with two elements, in its lower section a tower 12 carrying a table 13 on which a cassette 14 is slidable for taking two positions, namely an active position in which it is axially aligned under the cylinder unit 11 and a rest position in which it is offset from the remainder of the machine. The machine stand 10 further carries a second tower 15, shown in dashed lines in FIG. 9, on which is rotatably mounted a circular disk 16 at the periphery of which are mounted the holder devices 9. The spacing between the center of the dish 16 and the alignment axis of the cylinder unit 11 and cassette 14 in their operative position is such that, when the dish 16 is rotated, the holders 9 will successively come into alignment with this axis of alignment. A servo drive, which will not be described in further detail, provides that the stepwise rotation of the dish 16 will be synchronized with the movements of the cylinder 11.

As will be seen more particularly from FIGS. 7 and 8, the cylinder piston unit 11 comprises two telescopic elements 17, 18 which can be locked together by a latch 19. On FIG. 7 can be seen the cylinder 20 of the cylinder/piston unit 11 and its feed lines 21, 22. The telescopic elements 17, 18 are mounted in a collar 23 carried by the frame 10. To this collar 23 is fixed a guide plate 24 for the latch 19. This latch is formed of a rod 25, one end of which cooperates with a recess 26 formed in the second element 18, the rod 25 being guided in a sheath 27 bound up with the first element 17. The other end of the rod 25 carries a roller 28 pressed against the guide plate 24 by a spring 29. The lower section 30 of guide plate 24 is slanted for allowing the release of the latch out of the recess 26 at the end of the downward stroke of the first element 17, thus causing the second element 18 to travel downwards.

The bottom end of the first element 17 has a generally frusto-conical shape, with a bevel at its base for cooperating as will best be seen from FIG. 10—with the steps of the cone formed by the jaws of the clamping device which will be described in more detail hereinafter. The bottom end 32 of the second element 18 is also of a generally frusto-conical shape with a bevel at its base, but having a smaller size. This bottom end 32 will come to rest against the top cotyloid of the poultry piece to be treated, namely a wing 3 or a pinion 2, during the downward stroke of the piston; the bevel on the base is intended for guiding the skin and the flesh at the beginning of the trussing-up movement, while the frusto-conical slope has the purpose of facilitating the pushing-out of the meatball during the retracting movement of the piston. Preferably, the bottom end 32 of element 18 will be made of a material having a small friction factor or will be coated with such material. It may also be removably mounted on element 18 so as to be easily replaced.

The cassette 14 includes the clamping device with movable jaws which carries out the trussing-up operation in combination with the holder devices 9 and the cylinder/piston unit 11.

This cassette 14 is formed of a housing 33, the bottom thereof having an aperture 34 in registry with the opening of a discharge funnel 35 fixed to the stand 10, through which funnel the processed pieces fall into a suitable container (not shown) placed under the stand 10. Between the bottom of the housing 33 and the funnel 35 is placed a deformable membrane 36 having a central opening with a smaller diameter than the opening 34, this opening of the membrane having a dual function, namely to complete the shaping of the meatball during the downward stroke of the piston 11 and to assist the pushing-out of the meatball during the retracting stroke of the piston.

The housing 33 is closed at its top by means of a removable lid 37 held by threaded knobs 38. As a variant, these knobs may be replaced with quick fasteners of any known type. The lid 37 also has a central opening 39 coaxial with the opening 34 and having its edge surrounded by a flange 40 on which is fixed a deformable sealing membrane 41 having a hole in its center and effecting the guiding of the piece being processed, upstream of the jaws 44. This membrane 41 is fixed to the flange 40 by means of a ring 41'.

The lateral sides of the housing 33 have bores 42 for the passage of guide rods 43 screwed into the back side of the jaws 44 disposed inside the housing 33. Springs 45 surrounding each one of the guide rods 43 are interposed between the edge of the housing 33 and the back side of the corresponding jaw 44. Under the lid 37 are provided ribs 46 intended for guiding the translation movement of the jaws 44 and for limiting the retraction movement thereof during the passage of a wing or pinion being pushed through by the piston 11. For this purpose, each jaw 44 has on its top surface a groove 48. Four jaws 44 are placed side-by-side inside the housing 33. Their front faces form a cone having its apex directed downwards, the stepped profile of this cone being visible in FIG. 10. It has been found that this stepped profile achieved far better results than a smooth profile. The housing 33 is further provided on two of its opposite sides with handles 48 for an easy handling.

FIG. 11 is a schematic view illustrating the principle of operation of the machine. It shows in full lines the position of the bottom end 32 of the element 18 of the cylinder and piston unit 11 passing through the upper membrane of a holder device 9 during the retracting movement of said element, while there is shown in dashed lines the lowermost position of the bottom end 31 of element 17 of the cylinder and piston unit 11 at the end of its downward stroke, the jaws 44 being then at their maximal spacing apart. For the sake of simplicity, there have been omitted the lower membrane of the holder device 9 and those parts of the housing 33 other than the jaws 44.

In FIGS. 12A and 12B, a preferred embodiment of the jaws in accordance with this invention comprises four jaws 50-53 which cooperate so as to form a cone.

Each jaw 50-53 comprises a raised portion 50a-53a extending beyond the quarter of the circumscribed cylindrical sector and a matching recessed formation 50b-53b matching the raised portion of the adjacent jaw.

The cooperation of adjacent jaws produces a meshing together of the jaws 50-53 during their successive opening and closing movements, so that the central space 54 corresponding to the passage of the frusto-conical tip 32 is limited on each side by the lateral walls 55-58 of the raised portions 50a-53a. This avoids pieces of flesh or bone being introduced between the jaws 50-53, which would be liable to hinder the proper operation of the jaws by restricting their opening or closing.

In the example illustrated, the raised portions 50a-53a have the shape of straight prisms with a trapezoidal base, but it will be understood that any other shape of the said raised portions adapted for forming the walls 55-58 does not depart from the scope of the present invention.

FIG. 13 shows an additional device for holding the lollipop, this device being adapted for retaining the bone 59 during the return stroke of the pusher device 11. This device comprises at least one cylinder/piston unit 60 or 61, preferably two such units moving in opposite direction for applying at least one clamping pad 62 or 63 against the bone 59.

Preferably, both pads 62, 63 move to clamp the bone 59 on both sides, just after the stopping of the pusher device 11 in its lower position and before the return stroke of said pusher device 11.

After the pusher device 11 has raised again, both pads 62, 63 return to the position shown in full lines for allowing the dish 16 to rotate for processing the next holder device 9.

The invention is not restricted to the above-described embodiment. It includes every machine capable of trussing up flesh and/or skin over a bone or bone stump, and comprising an axially aligned set of a pusher device, a holder device and movable jaws forming a cone.

We claim:

1. In a machine for the automatic trussing-up of the skin and flesh of pre-cut poultry wings and pinions having bones, comprising a pusher device (11) having a head (32) adapted to press down against an upper end (8, 7) of a pre-cut wing (3) or pinion (2), a holder device (9) coaxial with the pusher device (11), the holder device comprising working members (44) having a cone shape adapted to grasp and hold a said wing or pinion; the improvement wherein the apex of said cone shape of the working members (44) is directed downward, the working members (44) comprising stepped jaws movable with a translatory movement against springs (45), the jaws (44) and the pusher device (11) comprising trussing-up means, the jaws being adapted, when close to each other as the pusher device (11) exercises a pushing force against the wing (3) or pinion (2), to truss up the skin and flesh on the bone so as to form a ball of meat on the bone.

2. A machine according to claim 1, wherein each jaw (44) has, when viewed from above, a shape of a substantially circular sector, each jaw having a raised portion (50a-53a) extending beyond the contour of said sector, and a recess formation (50b-53b) matching a said raised portion (50a-53a) of an adjacent said jaw, these matching raised portions and recessed formations (50a-53a and 50b-53b) cooperating with each other so as to produce an interfingering of the jaws (50-53) during their successive opening and closing movements.

3. A machine according to claim 2, there being four said movable jaws (44).

4. A machine according to claim 2, wherein the movable jaws (50-53) are mounted side by side in a housing (33) and each jaw has a guide rod (43) passing through the housing (33) and surrounded by a spring (45).

5. A machine according to claim 3, wherein the housing (33) has ribs (47) riding in grooves (48) formed in the upper face of the jaws.

6. A machine according to claim 3, wherein the housing (33) has a removable lid.

7. A machine according to claim 1, wherein the pusher device (11) is constituted by a cylinder/piston unit with two telescopic elements (17, 18), a head (31) of the first element (17) having a stroke and being adapted to abut, at the end of said stroke, the lower end of the cone (44) formed by the jaws (50-53), while a head (32) of the second element (18) bears against the bone (8, 7) of the wing (3) or pinion (2) to be processed, the abutting of said first element (17) releasing a latch (19) allowing said second element (18) to pass through the cone for completing the trussing-up of flesh and skin over the bone and thereafter for releasing the bone with the ball of meat having thus been formed thereon during a retractive movement of the piston (11).

8. A machine according to claim 7, wherein the latch (19) is comprised by a rod (25) one end of which cooperates with a recess (26) formed in the second element (18), said rod (25) being guided in a sleeve (27) bound up with the first element (17); the other end of said rod (25) carrying a roller (28) pressed by a spring (29) against a guide plate (24) carried by a machine stand (10), and wherein said guide plate (24) is slanted at its lower end (30) for allowing the latch (19) to be released from the recess (26) at the end of the downward stroke of the first element (17), thereby causing said second element (18) to move downward.

9. A machine according to claim 1, wherein the holder device (9) is comprised by a tubular sleeve both ends of which are each closed by a deformable membrane having a hole in its center.

10. A machine according to claim 9, wherein the holder device (9) comprises an additional deformable membrane disposed between the two membranes provided on the ends thereof.

* * * * *